United States Patent
Lin et al.

(10) Patent No.: US 9,137,421 B2
(45) Date of Patent: Sep. 15, 2015

(54) IMAGE READING DEVICE AND METHOD OF READING IMAGES

(71) Applicants: SINTAI OPTICAL (SHENZHEN) CO., LTD., Shenzhen (CN); ASIA OPTICAL INTERNATIONAL LTD., Tortola (VG)

(72) Inventors: Hsien-Chi Lin, Taichung (TW); Kung-Hsin Teng, Taichung (TW); Chih-Wen Wang, Taichung (TW); Ming-Fu Hsu, Taichung (TW)

(73) Assignees: ASIA OPTICAL INTERNATIONAL LTD., Tortola (VG); SINTAI OPTICAL (SHENZHEN) CO., LTD., Shenzhen (CN)

(*) Notice: Subject to any disclaimer, the term of this patent is extended or adjusted under 35 U.S.C. 154(b) by 14 days.

(21) Appl. No.: 14/310,469

(22) Filed: Jun. 20, 2014

(65) Prior Publication Data

US 2014/0300940 A1    Oct. 9, 2014

Related U.S. Application Data

(63) Continuation-in-part of application No. 13/237,077, filed on Sep. 20, 2011.

(51) Int. Cl.
*H04N 1/46* (2006.01)
*H04N 1/04* (2006.01)
*H04N 1/48* (2006.01)

(52) U.S. Cl.
CPC ................................. *H04N 1/484* (2013.01)

(58) Field of Classification Search
CPC ....... H04N 1/486; H04N 1/193; H04N 9/045; H04N 1/12; H04N 1/00002
USPC ......... 358/505, 509, 512–514, 475, 482, 483, 358/497, 474; 382/312, 318, 319, 162; 250/208.1, 234–236, 216
See application file for complete search history.

(56) References Cited

U.S. PATENT DOCUMENTS

| | | | | |
|---|---|---|---|---|
| 5,340,977 A * | 8/1994 | Kojima et al. | ............ | 250/208.1 |
| 5,428,463 A * | 6/1995 | Goto | ............ | 358/482 |
| 5,920,063 A | 7/1999 | Kawamoto et al. | | |
| 6,335,805 B1 * | 1/2002 | Ishiguro et al. | ............ | 358/474 |
| 6,456,748 B1 * | 9/2002 | Yushiya et al. | ............ | 382/312 |
| 6,667,818 B1 * | 12/2003 | Kuo | ............ | 358/514 |
| 6,943,922 B2 * | 9/2005 | Yamamoto et al. | ............ | 358/474 |
| 7,154,641 B2 * | 12/2006 | Ichikawa | ............ | 358/483 |
| 7,418,138 B2 | 8/2008 | Ahmed | | |
| 7,449,666 B2 | 11/2008 | Kaihotsu | | |

* cited by examiner

Primary Examiner — Cheukfan Lee
(74) Attorney, Agent, or Firm — Tracy M Heims; Apex Juris, Pllc

(57) ABSTRACT

An image reading device for reading an image of an object includes a multi-color light source which projects light rays with at least three colors onto the object, at least three monochrome image sensor rows, and at least a lens row provided between the object and the monochrome image sensor rows, wherein reflected light rays are imaged directly onto the monochrome image sensor rows through the lens row, and wherein switching between any two colors occurs only once every time the multi-color light source, the image sensor rows, and the lens row are moved for a predetermined distance. The image reading device is able to read color and monochrome images.

15 Claims, 7 Drawing Sheets

IMAGE READING DEVICE AND METHOD OF READING IMAGES

BACKGROUND OF THE INVENTION

1. Technical Field

This application is a continuation in part of U.S. patent application Ser. No. 13/237,077 titled "METHOD OF READING IMAGE AND THE IMAGE READING DEVICE", the subject matter thereof being fully incorporated herein by reference.

2. Description of Related Art

A conventional image reading device 70 disclosed as prior art in U.S. Pat. No. 7,449,666 is shown in FIG. 4 and FIG. 5, which includes a multi-color light source 71, a rod-shaped lens array 73, and a monochrome image sensor array 75. While the multi-color light source 71, the rod-shaped lens array 73, and the monochrome image sensor array 75 are moved simultaneously in the same direction, the multi-color light source 71 emits light rays of different colors in a predetermined order, which are red light rays 71R, green light rays 71G, and blue light rays 71B. These light rays 71R, 71G, and 71B are projected onto an object 99 and then reflected. The reflected light rays 71R, 71G, and 71B image on the monochrome image sensor array 75 through the rod-shaped lens array 73. The monochrome image sensor array 75 generates signals after sensing the reflected light rays 71R, 71G, and 71B.

The conventional image reading device 70 senses images of all colors merely through the single one monochrome image sensor array 75, and therefore the multi-color light source 71 has to continuously switch between the three kinds of light rays 71R, 71G, and 71B within a distance as wide as a pixel. The multi-color light source 71, the rod-shaped lens array 73, and the monochrome image sensor array 75 are moved simultaneously for a distance as wide as a pixel. As a result, in each pixel of the object 99 sensed by the monochrome image sensor array 75, each light rays 71R, 71G, and 71B occupies only one-third of the pixel, which leads to chromatic aberration in each pixel with two-third bias.

Another conventional image reading device 80, which is also disclosed as prior art in U.S. Pat. No. 7,449,666, is shown in FIG. 6 and FIG. 7. The conventional image reading device 80 projects white light rays emitted by a white light source 81 onto an object 99, and then the white light rays are reflected. The reflected white light rays image on three monochrome image sensor arrays 85R, 85G, and 85B through a rod-shaped lens array 83, wherein the three monochrome image sensor arrays 85R, 85G, and 85B respectively have light filters 86R, 86G, and 86B for filtering red light rays, green light rays, and blue light rays. The colors of an image of the object 99 can be distinguished in this way. The conventional image reading device 80 has three monochrome image sensor arrays 85R, 85G, and 85B, and therefore it can sense three pixels on the image of the object 99 at once.

As we can see in FIG. 7, every time the white light source 81, the rod-shaped lens array 83, and the monochrome image sensor arrays 85R, 85G, and 85B are moved for a distance as wide as a pixel, the monochrome image sensor arrays 85R, 85G, and 85B respectively and simultaneously sense three different pixels on the image of the object 99, wherein the colors of the three pixels may differ from each other. After the white light source 81, the rod-shaped lens array 83, and the monochrome image sensor arrays 85R, 85G, and 85B are moved to project the white light rays on the third pixel on the image of the object 99, the sensed image from the object 99 is chromatic thereafter.

Although the conventional image reading device 80 solves the problem of chromatic aberration in pixels of the other conventional image reading device 70, most energy of the white light rays is filtered out after passing through the light filters 86R, 86G, and 86B, which is wasteful. If we want to speed up the scanning speed, the luminance of the white light rays has to be increased, which worsens the problem of power consumption and heat generation of the white light source 81. Furthermore, providing the light filters 86R, 86G, and 86B in the image reading device 80 increases cost of manufacturing.

It is worth mentioning that the invention disclosed in the U.S. Pat. No. 7,449,666 includes light filters too, hence it has the aforementioned problem, too.

BRIEF SUMMARY OF THE INVENTION

In view of the above, the primary objective of the present invention is to provide a method of reading a color image, which solves the aforementioned problem of chromatic aberration in pixels.

Another objective of the present invention is to provide an image reading device, which solves the aforementioned problem of chromatic aberration in pixels without applying light filters. Therefore the cost of the apparatus is lowered, and the speed of reading images can be speeded up by fully utilizing the energy of light sources.

Yet another objective of the present invention is to provide a method of reading a monochrome image, which can read images with high speed, and the luminous power of light sources can be lowered.

The method of reading a color image provided in the present invention includes the following steps: A. place the object at a predetermined location; B. project first light rays of a first color onto the object, directly imaging the first light rays which are reflected from the object on at least three monochrome image sensor rows which sense the color image, and sending out signals which are generated by sensing the color image; C. generate a relative movement of a predetermined distance between the at least three monochrome image sensor rows and the object, emitting a second light rays of a second color instead of the first light rays to the object, directly imaging the second light rays which are reflected from the object on the at least three monochrome image sensor rows, and sending out signals which are generated by sensing the color image; D. generate a relative movement of the predetermined distance between the at least three monochrome image sensor rows and the object again, emitting a third light rays of a third color instead of the second light rays to the object, directly imaging the third light rays which are reflected from the object on the at least three monochrome image sensor rows, and sending out the signals which are generated by sensing the color image; E. generate a relative movement of the predetermined distance between the at least three monochrome image sensor rows and the object again, emitting the first light rays instead of the third light rays to the object, directly imaging the first light rays which are reflected from the object on the at least three monochrome image sensor rows, and sending out the signals which are generated by sensing the color image; F. repeat the steps from the step C to the step E until the entire color imaged is read.

Based on the same invention concept, the method of reading a monochrome image provided in the present invention includes the following steps: A. place the object at a predetermined location; B. blend light rays of three colors to form white light rays to be projected onto the object, directly imaging the white light rays reflected from the object on at least three monochrome image sensor rows which sense the monochrome image, and sending out signals which are generated by sensing the monochrome image; C. generate a relative movement between the at least three monochrome image sensor rows and the object; D. send out the signals which are generated by sensing the monochrome image with the at least three monochrome image sensor rows every time the at least three monochrome image sensor rows and the object are relatively moved for a predetermined distance, until the monochrome image of the object is completely sensed.

The image reading device provided in the present invention is used to read an image of an object, and the apparatus includes a multi-color light source, at least three monochrome image sensor arrays, at least one lens array, a driving member, and a control circuit. The multi-color light source alternatively emits light of at least three colors; the at least three monochrome image sensor arrays senses the image; the at least one lens array is provided between the object and the at least three monochrome image sensor arrays, wherein at least a part of reflected light directly images onto the at least three monochrome image sensor arrays through the at least one lens array; the driving member drives the multi-color light source, the at least three monochrome image sensor arrays, and the at least one lens array to move simultaneously in same direction; and the control circuit is electrically connected to the multi-color light source to control the multi-color light source to switch the light of the at least three colors with a predetermined order every time the multi-color light source, the at least three monochrome image sensor arrays, and the at least one lens array are moved for a predetermined distance.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
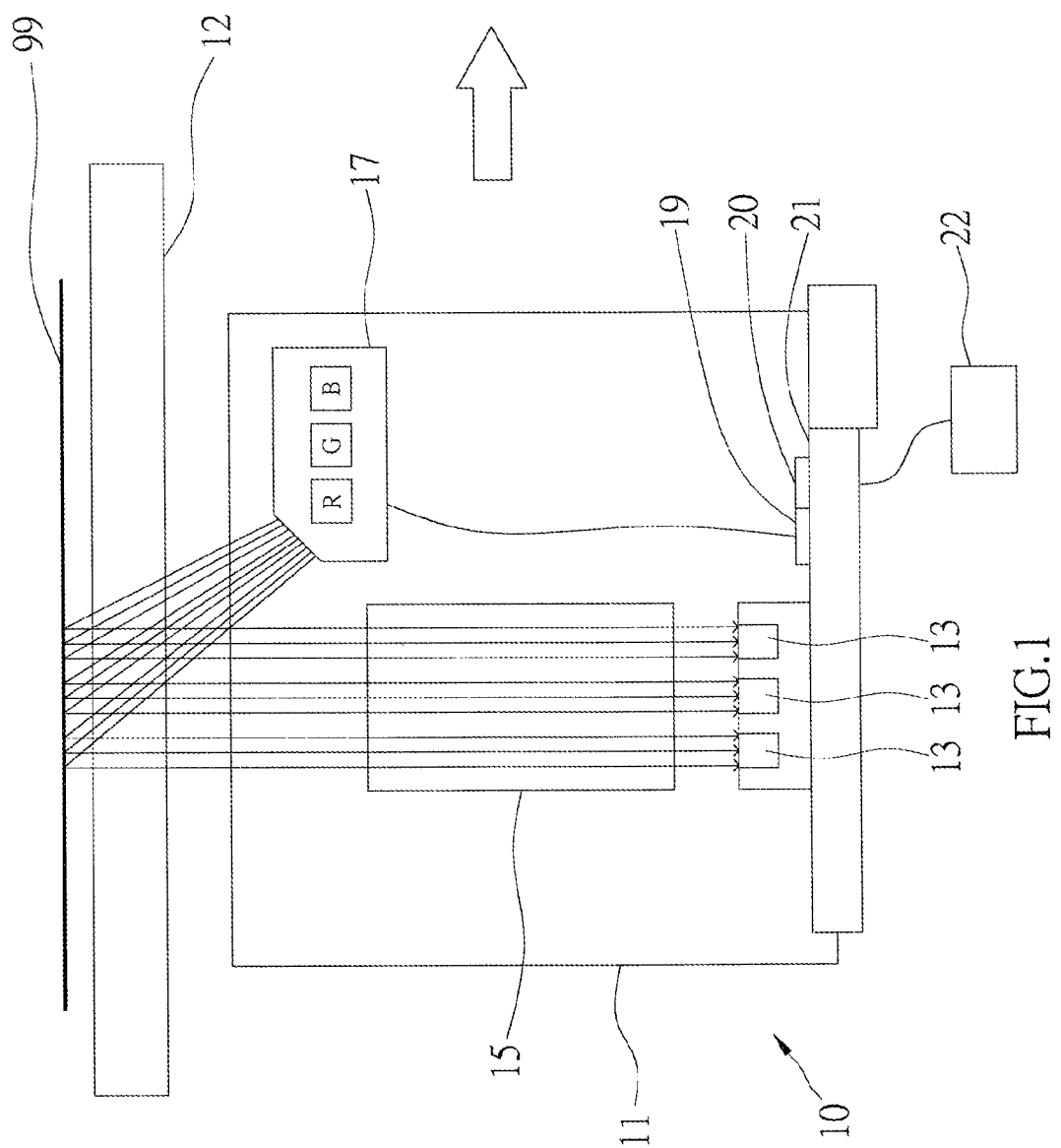
FIG. 1 is a schematic diagram showing the framework of the image reading device of a first preferred embodiment of the present invention.

An image reading device 10 of the present invention shown in FIG. 1 can be applied in scanners, copywriters, fax machines, or other business machines. The image reading device 10 can perform a method of reading a color image which is also provided in the present invention, wherein the purpose of the method is to read a planar image of an object or even of a three-dimensional object viewed from a single perspective.

Figure 2:
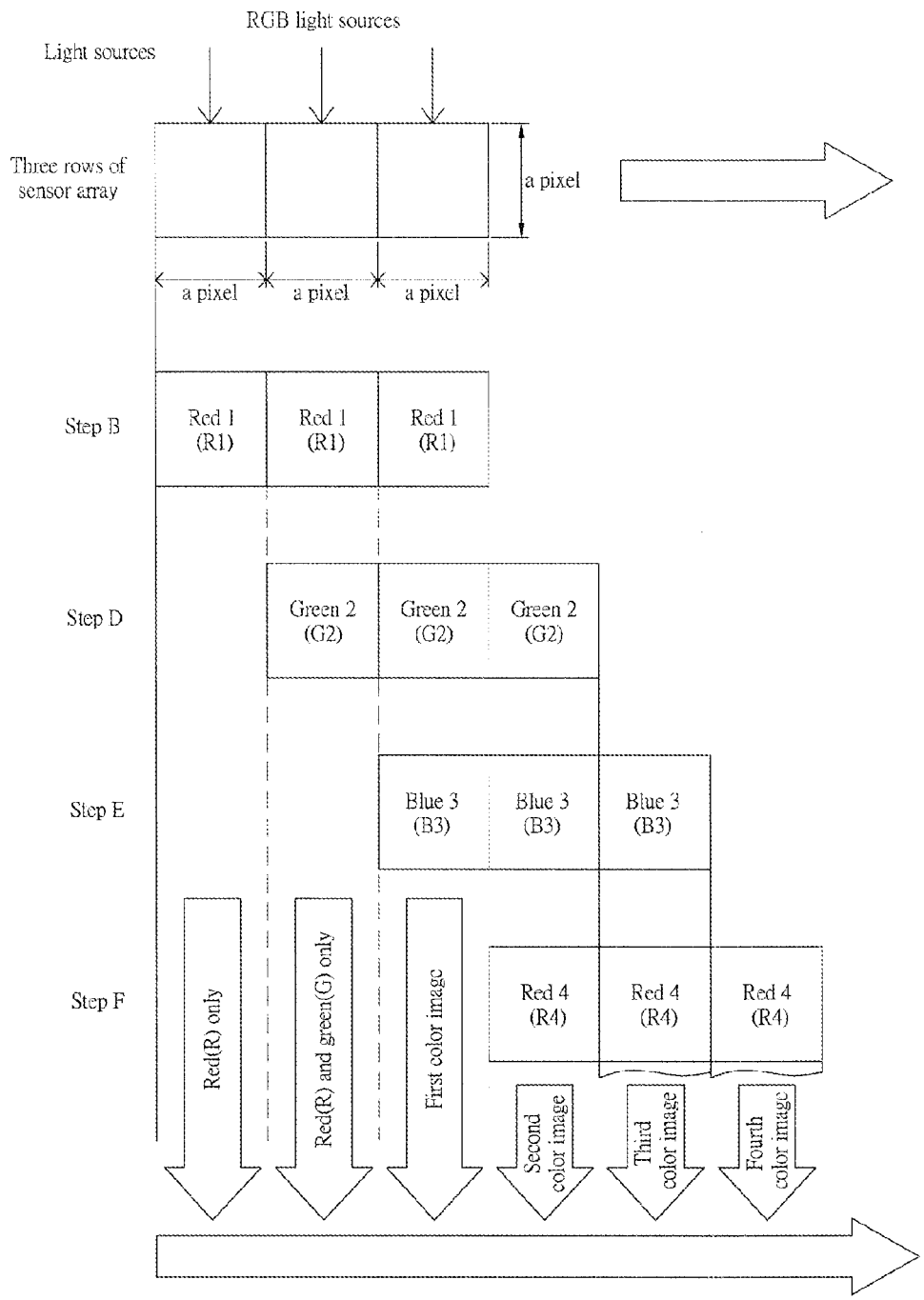
FIG. 2 is a schematic diagram showing the steps of the method of reading a color image.

The method of reading a color image is shown if FIG. 2, and includes the following the steps:

A. Place an object 99 at a predetermined location.

The image reading device 10 of a preferred embodiment of the present invention provides a transparent board 12 to perform the current the step. In more details, the object 99 is placed on the transparent board 12, and an image which is ready to be read is on a surface of the object 99 which faces a side of the transparent board 12. The transparent board 12 could be made of glass, plastic, or other transparent materials.

B. Project first light rays of a first color onto the object 99, directly image the first light rays which are reflected from the object 99 on at least three monochrome image sensor arrays, and then send out signals which are generated by sensing the image, wherein the first light rays are emitted by a multi-color light source which is able to emit light rays of at least three colors.

The image reading device 10 includes a multi-color light source 17 provided at an opposite side of the transparent board 12 to perform the current the step. In the preferred embodiment, the multi-color light source 17 is composed of light emitting diodes (LEDs) of three different colors. Wherein the light rays emitted by the multi-color light source 17 is flat, and the three colors are red, green, and blue. The first light rays are red, and the multi-color light source 17 emits second light rays of green color and third light rays of blue color as well. In other embodiments, the three colors are not necessary to be the same with the preferred embodiment. For example, they could be cyan, magenta, and yellow.

The image reading device 10 includes a control circuit 19, which is provided on a circuit board 21 and electrically connected to the multi-color light source 17 to control the multi-color light source 17 to emit the light rays of each color in a predetermined order with a switching rate. The control circuit 19 also decides how much energy to provide for the light rays of each color. The circuit board 21 is provided at the side of the transparent board 12 where the multi-color light source 17 is at.

The first light rays are projected onto the transparent board 12 with a suitable incident angle. After the first rays passing through the transparent board 12 and being projected onto the surface of the object 99 which faces the transparent board 12, the first rays are naturally reflected by the object 99.

The image reading device 10 includes at least three monochrome image sensor rows 13 provided in parallel, which are installed on the circuit board 21 and face the transparent board 12. In the preferred embodiment, the number of the monochrome image sensor rows 13 is three, and there can be more columns in other embodiments for better efficiency.

Besides, the image reading device 10 includes at least one rod-shaped lens row 15 provided at the side of the transparent board 12 where the multi-color light source 17 is at, and is between the transparent board 12 and the at least three monochrome image sensor rows 13. The reflected first light rays are imaged on the at least three monochrome image sensor rows 13 through the at least one rod-shaped lens row 15. The number of the rod-shaped lens row 15 is one in the preferred embodiment, but there can be more columns in other embodiments for better imaging results.

Relative location relations between the multi-color light source 17, the at least three monochrome image sensor rows 13, and the at least one rod-shaped lens row 15 are fixed. In the preferred embodiment, the multi-color light source 17, the circuit board 21, the at least three monochrome image sensor rows 13, and the at least one rod-shaped lens row 15 are all fixed on a base 11.

In the current the step, the first rays which are reflected from the object 99 are directly imaged on the at least three monochrome image sensor rows 13 without passing through any light filters. In other words, there is no light filters between the at least one rod-shaped lens row 15 and the at least three monochrome image sensor rows 13. Energy provided by the multi-color light source 17 can be prevented from being wasted with such design.

Furthermore, the image reading device 10 includes a reading circuit 20 provided on the circuit board 21 to read the signals which are generated by sensing the image of the object 99 with the at least three monochrome image sensor rows 13.

C. Move the multi-color light source 17, the at least one rod-shaped lens row 15, and the at least three monochrome image sensor rows 13 simultaneously in a predetermined direction.

In the current the step, the at least one rod-shaped lens row 15, the multi-color light source 17, and the at least three monochrome image sensor rows 13 are moved with the same speed. For such purpose, the image reading device 10 includes a driving member 22 to move the multi-color light source 17, the at least one rod-shaped lens row 15, and the at least three monochrome image sensor rows 13 in the predetermined direction with a constant speed, and therefore the multi-color light source 17, the at least one rod-shaped lens row 15, and the at least three monochrome image sensor rows 13 are moved simultaneously. The driving member 22 in the preferred embodiment is composed of a motor, a plurality of transmission components, such as gears, and a plurality of transmission shafts. Since the kind of driving member 22 is conventional, its detailed structure is not shown in the drawings.

D. Switch the multi-color light source 17 to emit the second light rays instead of the first light rays when the multi-color light source 17, the at least one rod-shaped lens row 15, and the at least three monochrome image sensor rows 13 are moved for a predetermined distance, directly image the second light rays which are reflected from the object 99 on the at least three monochrome image sensor rows 13, and sending out the signals which are generated by sensing the image.

In the preferred embodiment, the timing to switch the multi-color light source 17 is controlled by the control circuit 19. Such means of controlling is not described in detail herein because it is conventional.

In the current the step, the predetermined distance is as wide as a pixel in the preferred embodiment. Take a resolution of 600 dpi as an example, a width of a pixel is 0.04233 mm. Of course, the predetermined distance can be wider than a single pixel under different considerations.

As we have mentioned above, the second light rays are green in the preferred embodiment.

E. Switch the multi-color light source 17 to emit the third light rays instead of the second light rays when the multi-color light source 17, the at least one rod-shaped lens row 15, and the at least three monochrome image sensor rows 13 are moved for the predetermined distance again, directly image the third light rays which are reflected from the object 99 on the at least three monochrome image sensor rows 13, and sending out the signals which are generated by sensing the image.

In the preferred embodiment, the third light rays are blue as mentioned above.

F. Switch the multi-color light source 17 to emit the first light rays instead of the third light rays when the multi-color light source 17, the at least one rod-shaped lens row 15, and the at least three monochrome image sensor rows 13 are moved for the predetermined distance again, directly image the first light rays which are reflected from the object 99 on the at least three monochrome image sensor rows 13, and sending out the signals which are generated by sensing the image.

G. Repeat the step D to the step F until the image of the object 99 is completely sensed.

As shown in FIG. 2, in each the step between the step B and the step G, the at least three monochrome image sensor rows 13 sense three pixels on the image of the object 99 at once according to the imaging through the at least one rod-shaped lens row 15.

In more details, the at least three monochrome image sensor rows 13 sense a first pixel, a second pixel, and a third pixel on the image simultaneously under the projection of the first light rays in the step B.

As in the step D, since the multi-color light source 17 is switched to emit the second light rays of green color when the multi-color light source 17, the at least one rod-shaped lens row 15, and the at least three monochrome image sensor rows 13 are moved for the width of a pixel, the at least three monochrome image sensor rows 13 sense the second pixel, the third pixel, and a fourth pixel on the image simultaneously under the projection of the second light rays. At this time point, the at least three monochrome image sensor rows 13 has read a red and a green image of the second pixel and the third pixel on the image of the object 99.

As in the step E, since the multi-color light source 17 is switched to emit the third light rays of blue color when the multi-color light source 17, the at least one rod-shaped lens row 15, and the at least three monochrome image sensor rows 13 are moved for the width of a pixel again, the at least three monochrome image sensor rows 13 sense the third pixel, the fourth pixel, and a fifth pixel on the image simultaneously under the projection of the third light rays. At this time point, the at least three monochrome image sensor rows 13 has read the red, the green, and a blue image of the third pixel on the image of the object 99, which means, the third pixel on the image is read as a chromatic pixel.

Since from the step E, the following read pixels after the third pixel on the image of the object 99 are all chromatic without aberration. Therefore, the first aforementioned problem of the conventional technique is solved.

Furthermore, the method of reading a color image of the present invention directly images the light rays reflected from the object 99 on the at least three monochrome image sensor rows 13 without passing through any light filters, in other words, there is no light filters between the at least one rod-shaped lens row 15 and the at least three monochrome image sensor rows 13 of the image reading device 10 of the present invention. Therefore, the energy provided by the multi-color light source 17 can be fully utilized without being filtered out.

Figure 3:
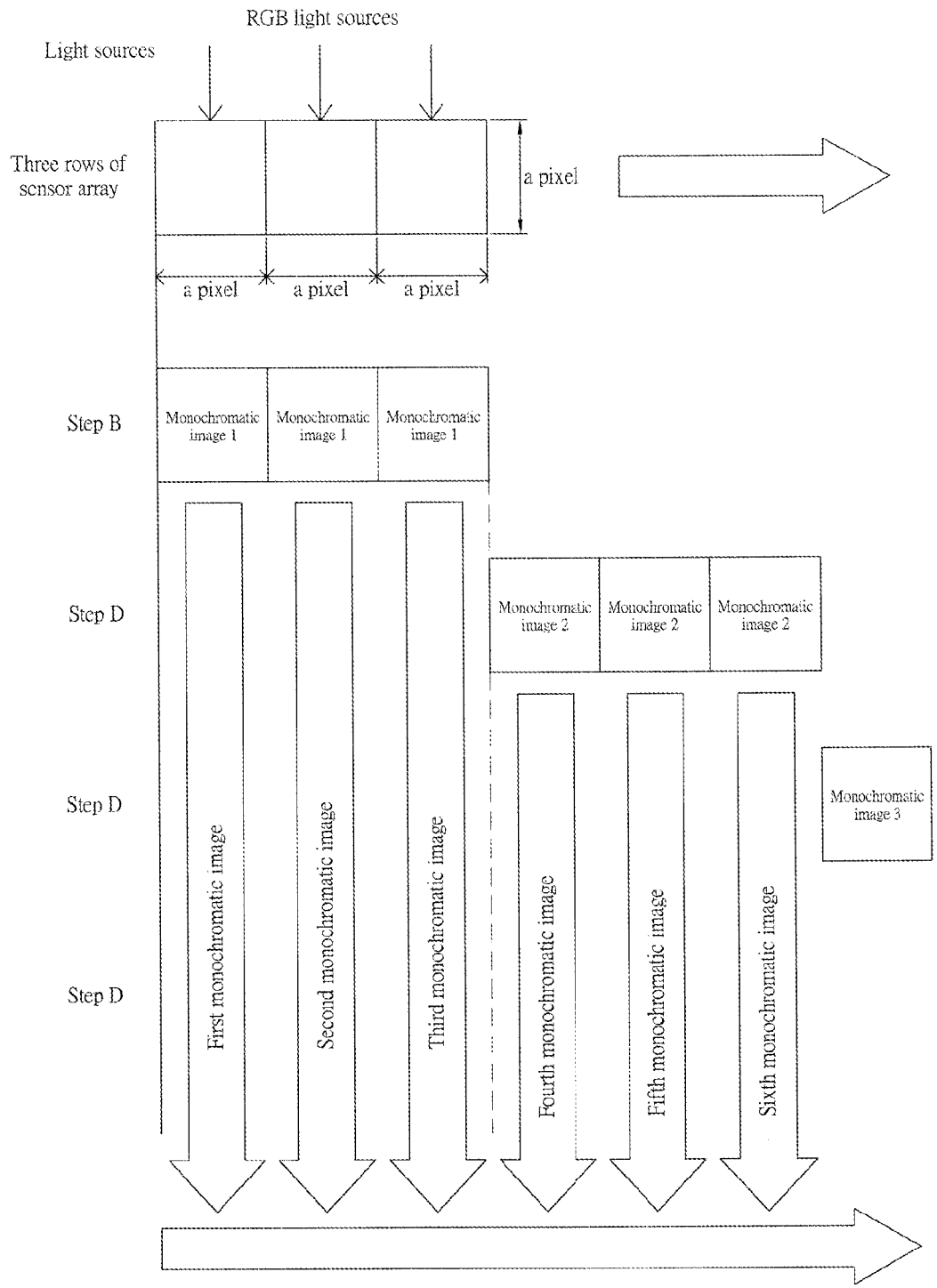
FIG. 3 is a schematic diagram showing the steps of the method of reading a monochrome image.
Figure 4:
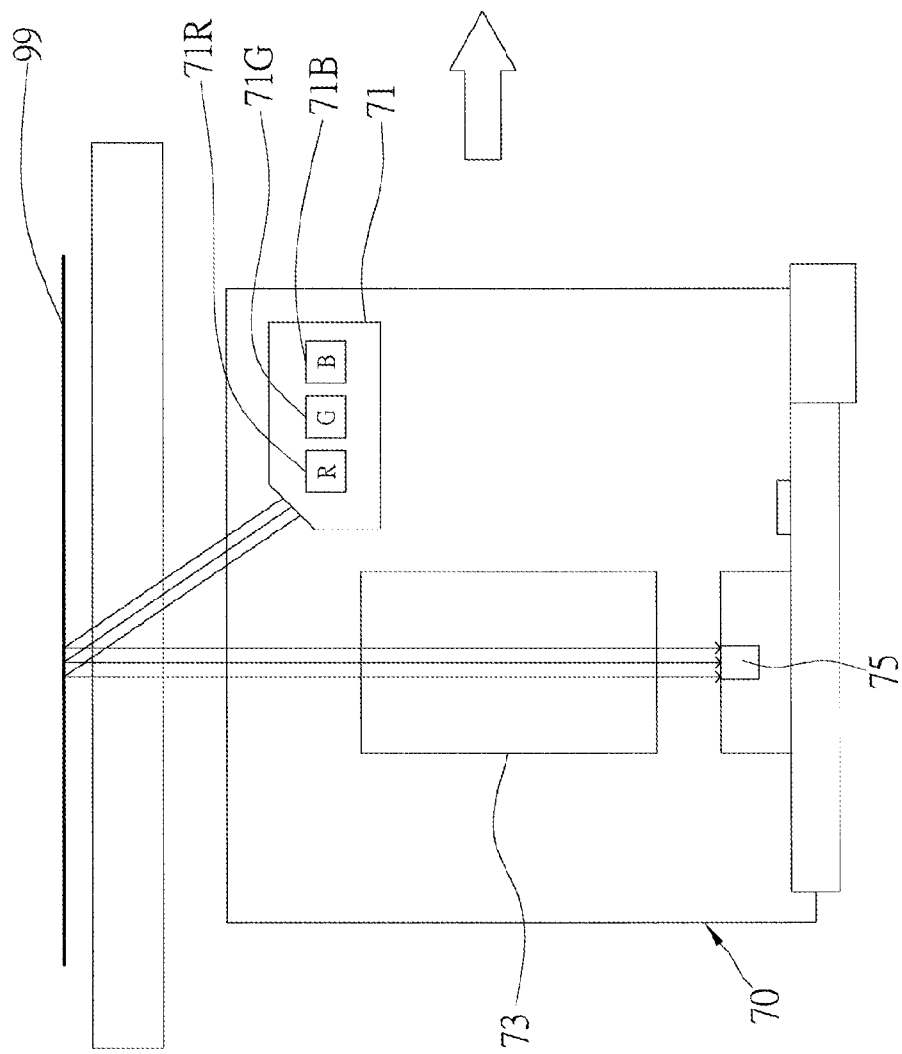
FIG. 4 is a schematic diagram showing the framework of a conventional image reading device.
Figure 5:
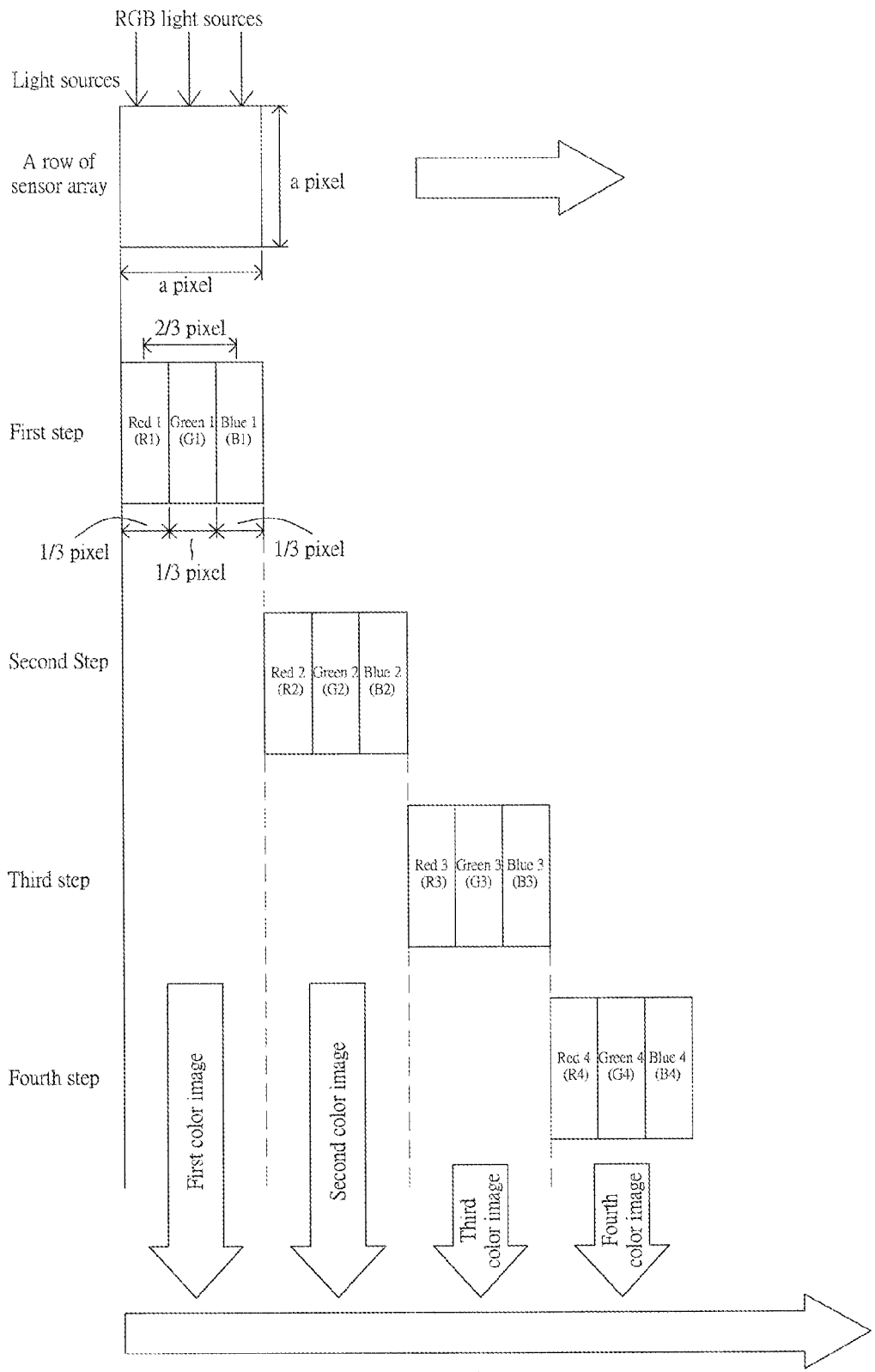
FIG. 5 is a schematic diagram showing the steps of the method of reading a color image performed with the image reading device in FIG. 4.
Figure 6:
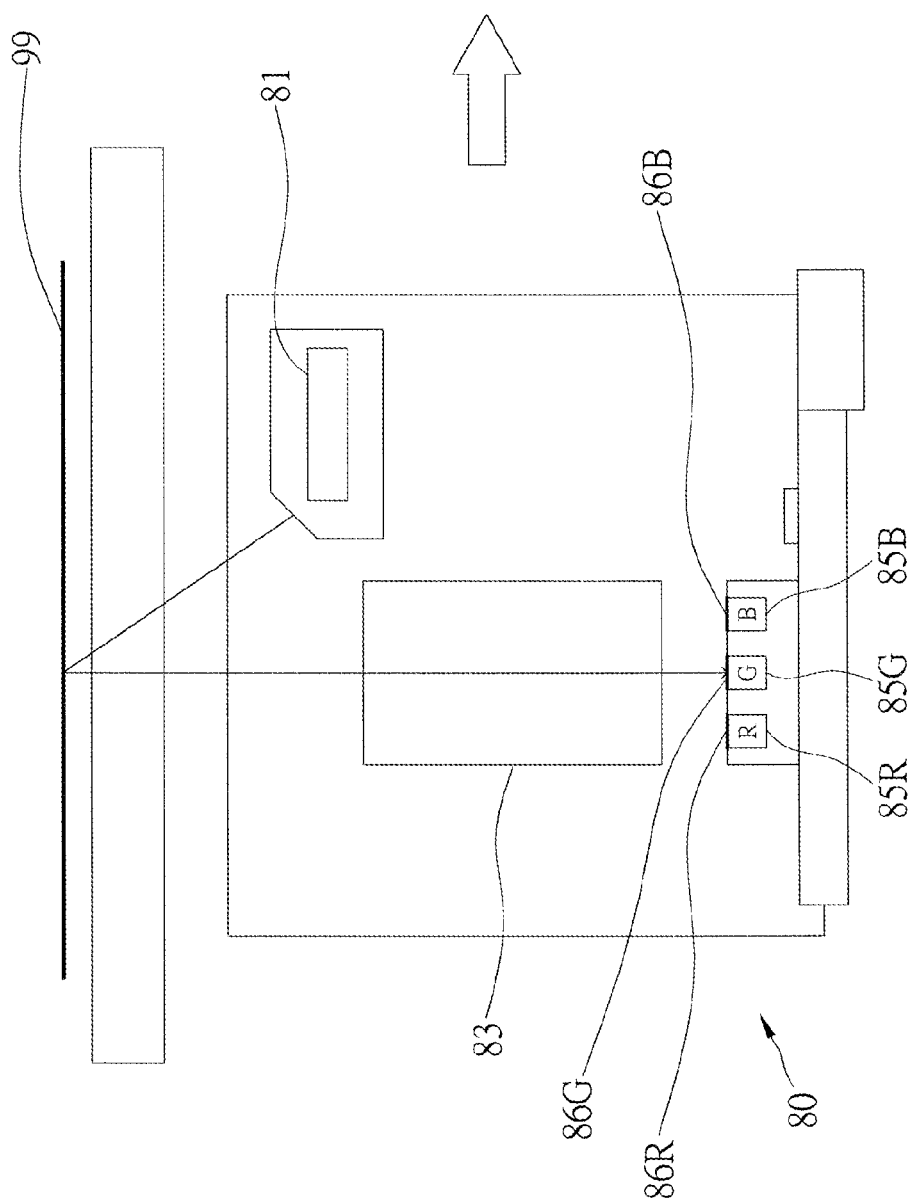
FIG. 6 is a schematic diagram showing the framework of another conventional image reading device.
Figure 7:
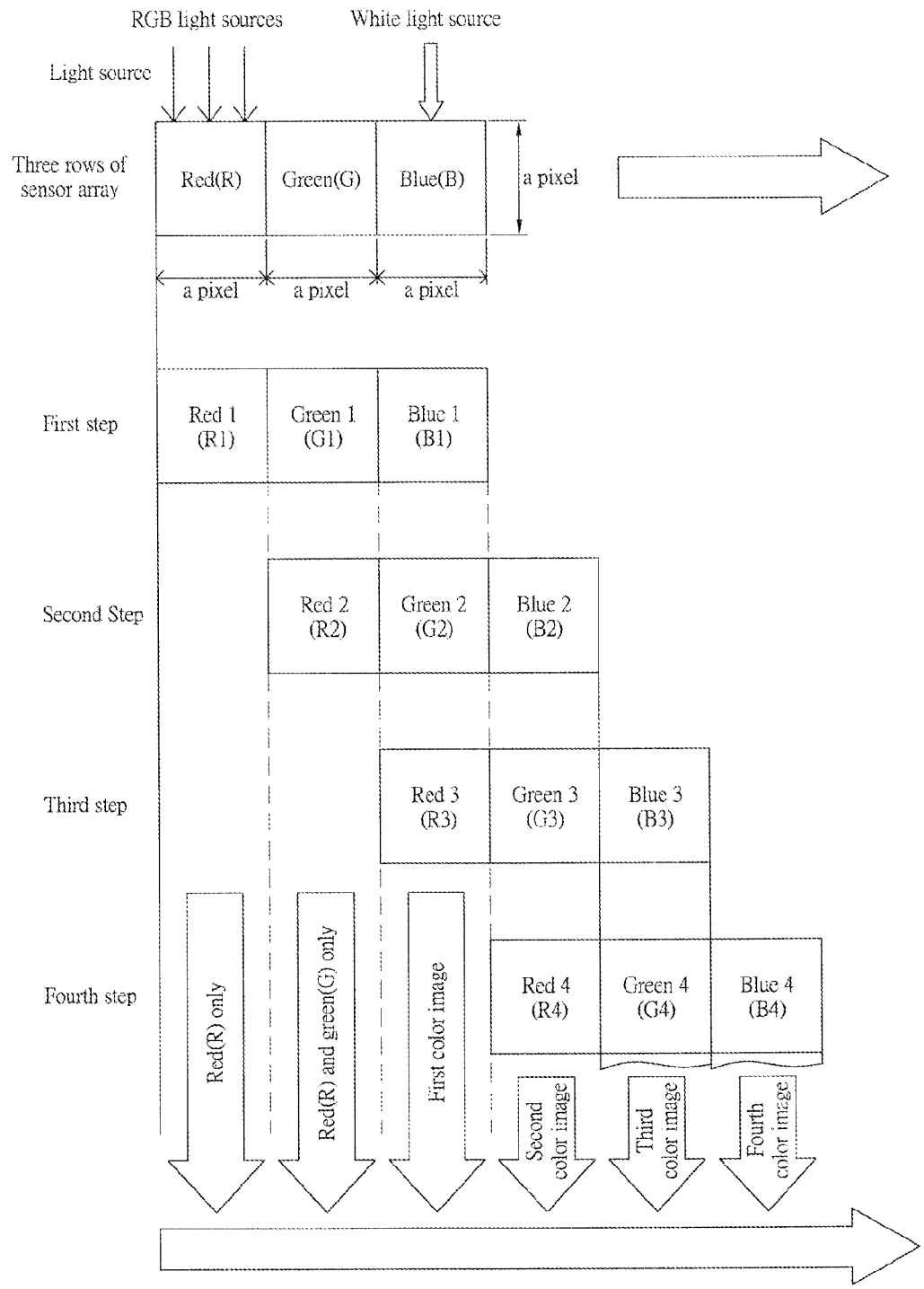
FIG. 7 is a schematic diagram showing the steps of the method of reading a color image performed with the image reading device in FIG. 6.

As shown in FIG. 3, in addition to the aforementioned method of reading a color image, the present invention further provides a method of reading a monochrome image based on the same invention concept. The method of reading a monochrome image can be applied with the aforementioned image reading device 10 shown in FIG. 1, wherein the method includes the following the steps:

A. Place the object 99 at the predetermined location.

B. Blend light rays of three colors emitted by the multi-color light source 17, which alternatively emits light rays of at least three colors, to form white light rays to be projected onto the object 99, letting the light rays reflected from the object directly image on the at least three monochrome image sensor rows 13, and sending out signals which are generated by sensing the image.

In the preferred embodiment, the three colors are red, green, and blue respectively, and the white light rays are formed by blending light rays of the three colors.

C. Move the multi-color light source 17 and the at least three monochrome image sensor rows 13 simultaneously in a predetermined direction.

D. Send out the signals which are generated by sensing the image with the at least three monochrome image sensor rows 13 every time the multi-color light source 17 and the at least three monochrome image sensor rows 13 are moved for a predetermined distance, until the image of the object 99 is completely sensed.

Wherein the predetermined distance is as wide as a plurality of pixels of which the number equals to the number of the monochrome image sensor rows 13. In the preferred embodiment, the number of the monochrome image sensor rows 13 is three, and therefore the predetermined distance is as wide as three pixels. In a case that the number of the monochrome image sensor arrays is 30, the predetermined distance is then as wide as 30 pixels.

Every time the multi-color light source 17 and the at least three monochrome image sensor rows 13 are moved for the predetermined distance, each monochrome image sensor row 13 senses a grey level image of three different pixels on the image of the object 99 simultaneously. As a result, the speed of reading the image is high, and a luminous power of the multi-color light source 17 can be lowered.

The aforementioned order for emitting the light rays, which is red, green, and then blue, is merely an example, and is not a limitation of the present invention. In other embodiments, the order can be different.

In the step C of the two methods, the multi-color light source 17 and the at least three monochrome image sensor rows 13 are moved simultaneously. In another embodiment, it is the object 99 to be moved in an opposite direction. In yet another embodiment, the object 99 and the multi-color light source 17 (along with the at least three monochrome image sensor rows 13) are moved with different speed or in different directions to generate a relative movement therebetween to achieve the same purpose.

It must be pointed out that the embodiments described above are only some preferred embodiments of the present invention. All equivalent structures and methods which employ the concepts disclosed in this specification and the appended claims should fall within the scope of the present invention.

What is claimed is:

1. An image reading device for reading an image of an object, comprising:
    a multi-color light source alternatively emitting light rays of at least three colors;
    at least three monochrome image sensor rows for sensing the image;
    at least one lens row provided between the object and the at least three monochrome image sensor rows, wherein the light rays which are reflected from the object are directly imaged onto the at least three monochrome image sensor rows through the at least one lens row;
    a driving member driving the multi-color light source, the at least three monochrome image sensor rows, and the at least one lens row to move simultaneously in a same direction; and
    a control circuit electrically connected to the multi-color light source to control the multi-color light source to emit the light rays of the at least three colors, wherein every time the multi-color light source, the at least three monochrome image sensor rows, and the at least one lens row are moved for a predetermined distance, a light ray of one of the at least three colors is switched into a light ray of another of the at least three colors, and wherein switching between any two colors occurs only once every time the multi-color light source, the at least three image sensor rows, and the at least one lens row are moved for the predetermined distance; and
    wherein the light rays of the at least three colors are sequentially switched in a predetermined order.

2. The image reading device of claim 1, wherein each of the at least one lens row includes a plurality of rod lenses.

3. The image reading device of claim 1, wherein the predetermined order which the control circuit follows to controls the multi-color light source to switch the light rays of the at least three light colors is based on a time sequence.

4. The image reading device of claim 1, wherein the at least three colors includes red, green, and blue.

5. The image reading device of claim 1, wherein the at least three colors includes cyan, magenta, and yellow.

6. The image reading device of claim 1, further comprising a reading circuit electrically connected to the at least three monochrome image sensor rows, to read signals which are generated by the at least three monochrome image sensor rows while sensing the image.

7. The image reading device of claim 1, wherein the predetermined distance is as wide as a pixel.

8. A method of reading a color image of an object, comprising the steps of:
    A. placing the object at a predetermined location;
    B. projecting first light rays of a first color onto the object, directly imaging the first light rays which are reflected from the object on at least three monochrome image sensor rows which sense the color image, and sending out signals which are generated by sensing the color image;
    C. generating a relative movement of a predetermined distance between the at least three monochrome image sensor rows and the object, emitting a second light rays of a second color instead of the first light rays to the object, directly imaging the second light rays which are reflected from the object on the at least three monochrome image sensor rows, and sending out signals which are generated by sensing the color image;
    D. generating a relative movement of the predetermined distance between the at least three monochrome image sensor rows and the object again, emitting a third light rays of a third color instead of the second light rays to the object, directly imaging the third light rays which are reflected from the object on the at least three monochrome image sensor rows, and sending out the signals which are generated by sensing the color image;
    E. generating a relative movement of the predetermined distance between the at least three monochrome image sensor rows and the object again, emitting the first light rays instead of the third light rays to the object, directly imaging the first light rays which are reflected from the object on the at least three monochrome image sensor rows, and sending out the signals which are generated by sensing the color image;
    F. repeating the steps from the step C to the step E until the entire color imaged is read.

9. The method of claim 8, wherein the first color is red, the second color is green, and third color is blue.

10. The method of claim 8, wherein the first color is cyan, the second color is magenta, and third color is yellow.

11. The method of claim 8, wherein the first light rays, the second light rays, and the third light rays reflected from the object are imaged on the at least three monochrome image sensor rows through at least a rod-shaped lens row.

12. The method of claim 8, wherein the predetermined distance is as wide as a pixel.

13. The method of claim 8, wherein the relative movements are generated by moving the object as the multi-color light source and the at least three monochrome image sensor rows are fixed.

14. The method of claim 8, wherein the relative movements are generated by moving the multi-color light source and the at least three monochrome image sensor rows simultaneously as the object is fixed.

15. The method of claim 8, wherein the relative movements are (the relative movement is) generated by moving the multi-color light source and the at least three monochrome image sensor rows simultaneously with a different speed or in a different direction from the object, which is also moved.

* * * * *